Dec. 28, 1965     S. KOPCHIK, JR., ETAL     3,225,946
CARRIER AND DISPENSER FOR WORK PIECES
Filed July 24, 1963                    5 Sheets-Sheet 1

STEVE KOPCHIK JR.
FRANCIS R. KELLEY
NORMAN FRANK PARRETT
                INVENTORS.

BY
JOHN P. CHANDLER
    THEIR ATTORNEY.

Dec. 28, 1965   S. KOPCHIK, JR., ETAL   3,225,946
CARRIER AND DISPENSER FOR WORK PIECES
Filed July 24, 1963   5 Sheets-Sheet 2
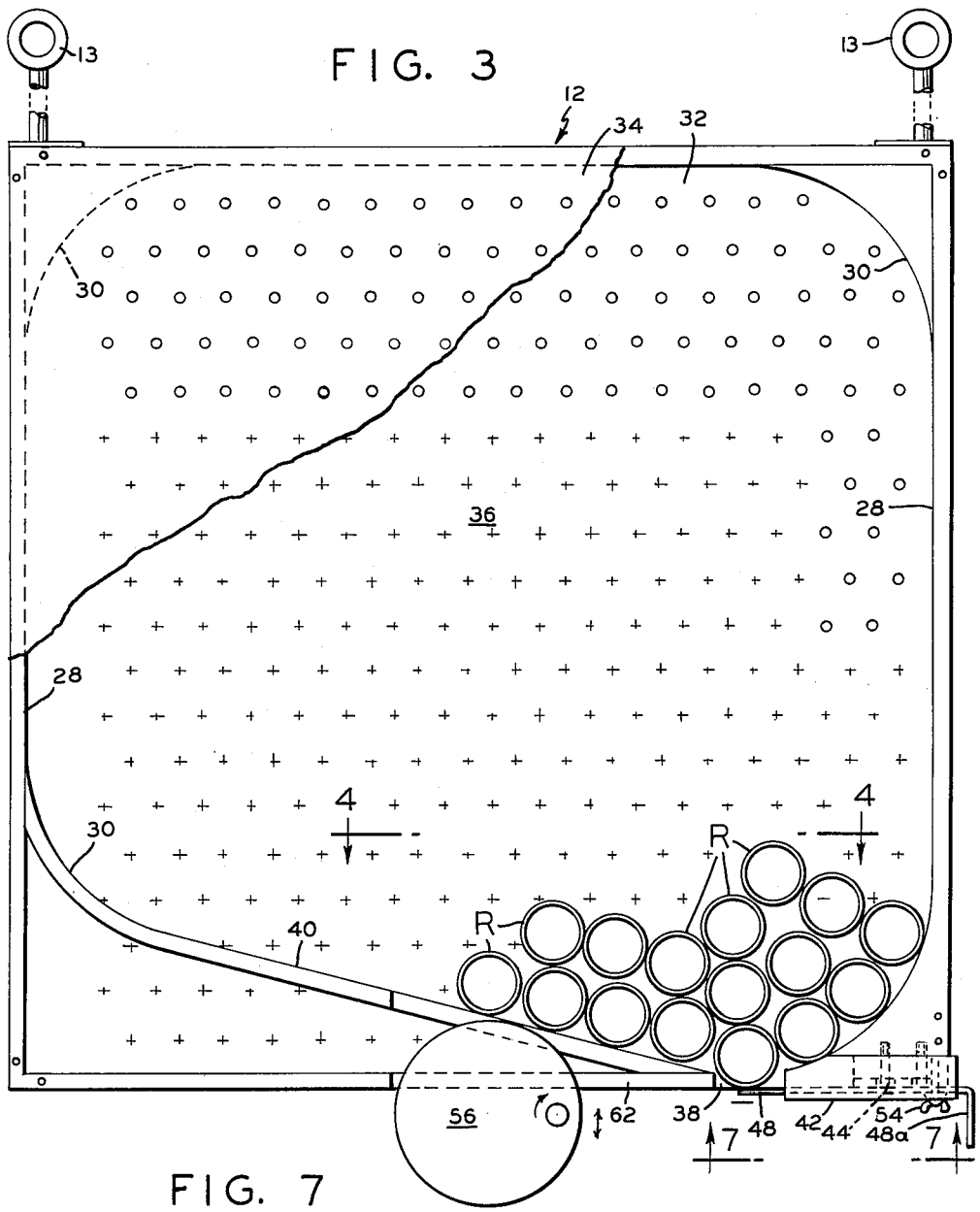
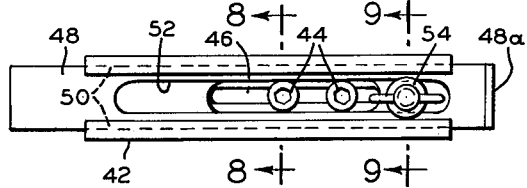
STEVE KOPCHIK JR.
FRANCIS R. KELLEY
NORMAN FRANK PARRETT
    *INVENTORS.*
BY
JOHN P. CHANDLER
    THEIR ATTORNEY.

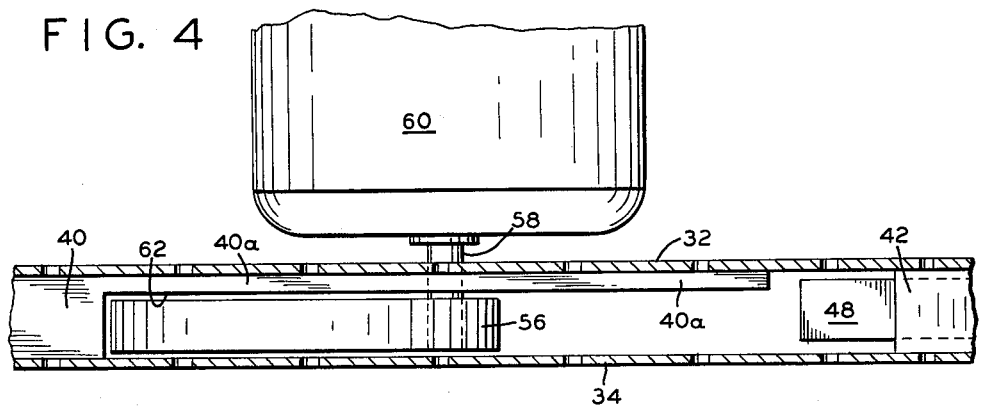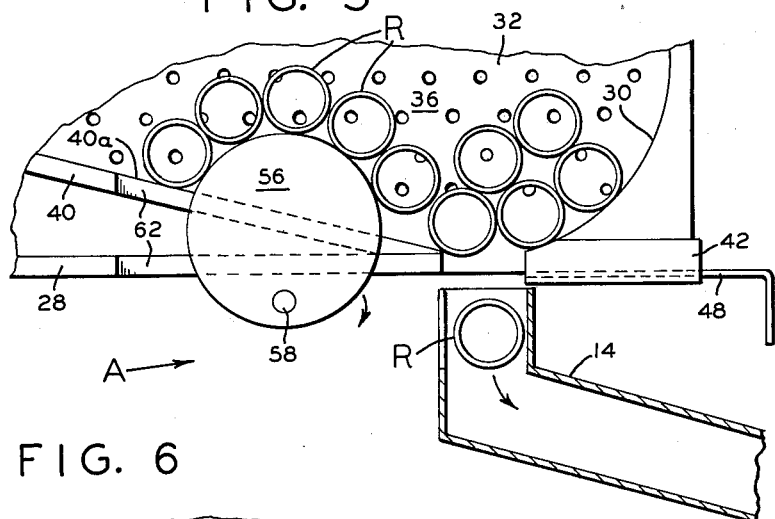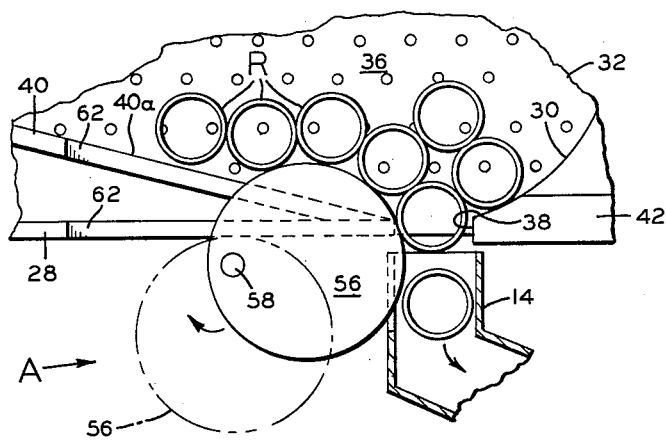

Dec. 28, 1965  S. KOPCHIK, JR., ET AL  3,225,946
CARRIER AND DISPENSER FOR WORK PIECES
Filed July 24, 1963  5 Sheets-Sheet 4
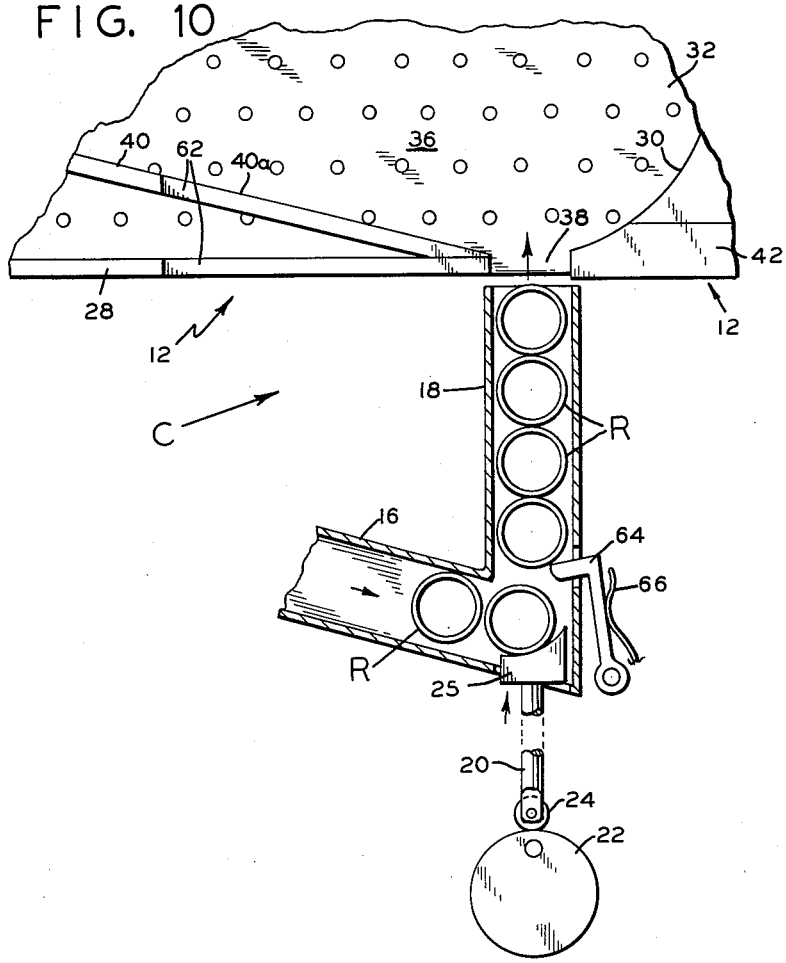
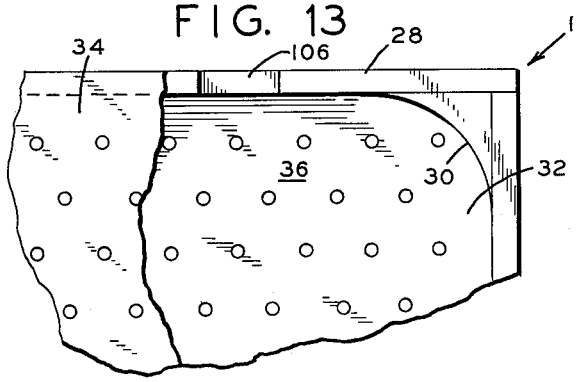
STEVE KOPCHIK JR.
FRANCIS R. KELLEY
NORMAN FRANK PARRETT
INVENTORS.
BY
  JOHN P. CHANDLER
THEIR ATTORNEY.

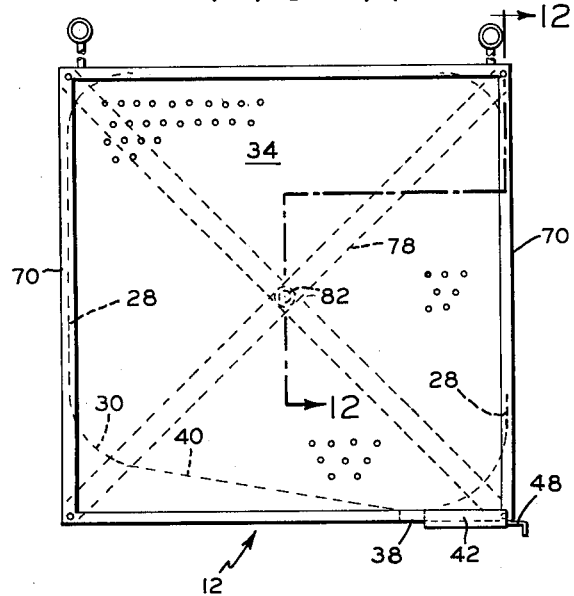
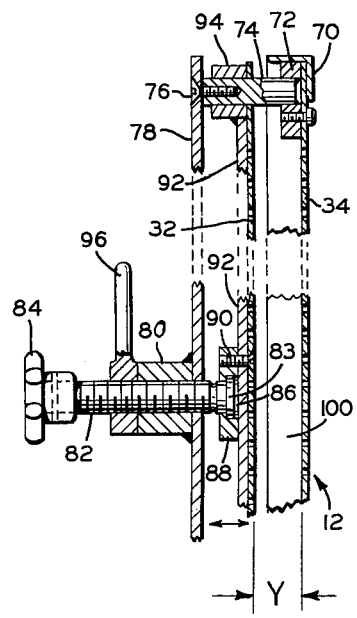
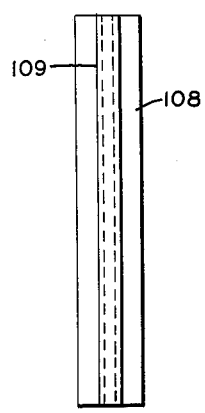
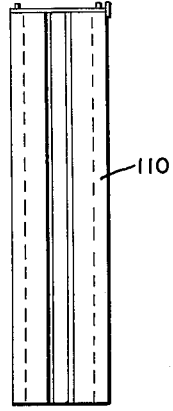
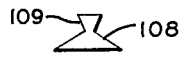

United States Patent Office 3,225,946
Patented Dec. 28, 1965

3,225,946
CARRIER AND DISPENSER FOR WORK PIECES
Steve Kopchik, Jr., Hastings-on-Hudson, N.Y., Francis R. Kelley, Ridgefield, and Norman Frank Parrett, Stamford, Conn., assignors to Universal American Corporation, a corporation of Delaware
Filed July 24, 1963, Ser. No. 297,398
3 Claims. (Cl. 214—300)

This invention relates to article carriers or hoppers and relates more particularly to a novel storage apparatus for use in connection with production machinery for receiving work pieces and for transporting them from machine to machine.

An important object of the invention is to provide a hopper-like carrier for work pieces, the carrier having means for dispensing the work piece, one by one, to a machine which operates upon them.

The present invention contemplates the use of two carrier-dispensers on a machine, one for feeding articles into the machine and one for receiving articles from the machine after being operated upon by said machine. This is not to be construed as limiting the invention to two carriers since, under certain conditions, carriers in addition to the two can be used.

One object of the invention is to provide a portable carrier for feeding articles into a machine and which, when empty, can be transferred to the output side of the machine to receive articles after some work has been performed on them by the machine.

Another object is to provide a carrier-dispenser into which work pieces are received after one machine operation and when full the carrier-dispenser is transferred to another machine to feed the articles in to it for another operation.

Another object is to provide a plurality of carrier-dispensers in conjunction with several machines each of which operate through a cycle of first, feeding articles into a machine, second, receiving articles from a machine and third, transporting to the next machine, to dispense articles therein.

One feature of the invention includes a plurality of carrier-dispensers for use upon one or more machines. Each machine is provided with a feeding station and a receiving station for the carrier-dispensers. Each carrier-dispenser is constructed to same so that it can be used either at the feeding station or at the receiving station. Each feeding station is provided with a mechanism which cooperates with the carrier-dispenser to discharge the articles therefrom. The receiving stations are provided with a mechanism for inserting the articles into the carrier-dispenser. A conveyor system operating overhead or at floor level is used to transport the carrier-dispensers from station to station and machine to machine. Each carrier-dispenser comprises a frame forming end walls and a bottom wall, and side walls defining a compartment for receiving a plurality of work pieces therein, and one or more openings in said walls for inserting and discharging the work pieces, and a manually operated gate for closing the opening to retain the articles therein. The side walls are perforated for facilitating the process of washing the articles.

The carrier of the present invention is designed particularly for articles of cylindrical shape and has means for adjusting the distance between its side walls. It has found great usefulness in the manufacture of ball bearing races where many operations must be successively performed such as face grinding, O.D. and I.D. grinding.

The carrier retains the races segregated and arranged for delivery at all times, thus providing for ease in handling. It also provides a true degree of control as compared with bulk handling since if a given machine starts to malfunction and produces a run of imperfect work pieces, it is easy to trace the parts which have been operated on by this machine and stop the subsequent operations on these parts before they are finally and irretrievably ruined.

The hopper arrangement of the present invention is essentially a power and free dispensing carrier, power being used for discharging the work pieces from the carrier and for feeding the work pieces into the carrier, the remaining operations being performed automatically by gravity.

Other objects and advantages of the present invention will become apparent upon perusal of the following detailed description taken in conjunction with the accompanying drawings which discloses, by way of example only, the principle of the invention.

FIG. 3 is a front elevational view, with panel partly removed, of a typical carrier-dispenser;

FIG. 4 is a sectional view taken along line 4—4 of FIG. 3;

FIG. 5 is a fragmentary elevational view of the discharge opening of the carrier-dispenser;

FIG. 6 is a view similar to FIG. 5 but showing a different position of the operating element;

FIG. 7 is a view taken along line 7—7 of FIG. 3;

FIG. 10 is a fragmentary elevational view similar to FIG. 5 but showing the carrier-dispenser in receiving position;

FIG. 11 is a front view of a modified carrier-dispenser;

FIG. 12 is a sectional view taken along line 12—12 of FIG. 11;

FIG. 13 is a broken side elevational view of the carrier showing a top wall opening;

FIG. 14 is a top plan view of a dovetail bar to be secured to the bottom of each carrier;

FIG. 15 is an end elevation thereof;

FIG. 16 is a top plan view of the trackway for receiving the dovetail bar; and

FIG. 17 is an end elevation thereof.

Figure 1:
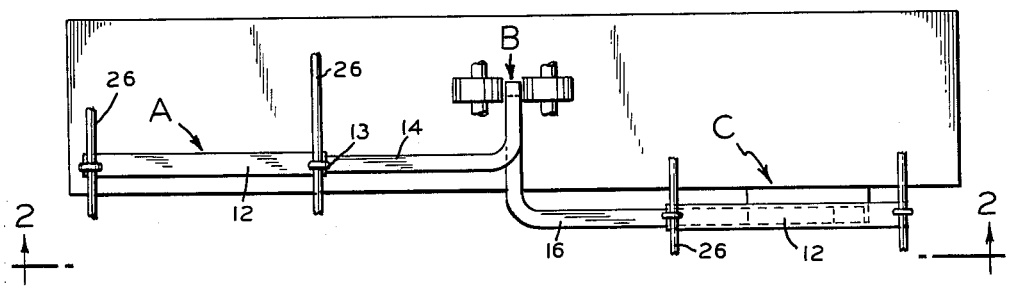
FIG. 1 is a plan view of a schematic outline of a machine including two carrier:dispensers.
Figure 2:
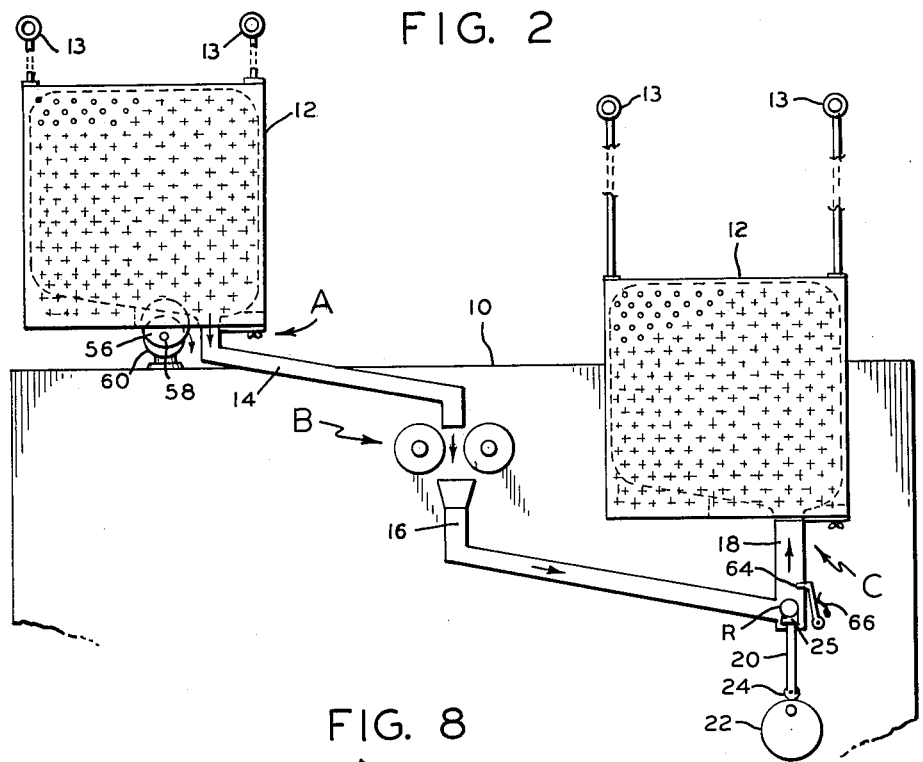
FIG. 2 is a front elevational view of the arrangement of FIG. 1 as seen along line 2—2 of FIG. 1.
Figure 9:
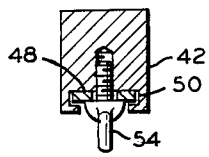
FIG. 9 is a sectional view taken along line 9—9 of FIG. 7.
Figure 8:
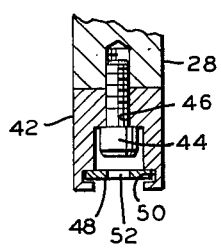
FIG. 8 is a view, in section, taken along line 8—8 of FIG. 7.

Referring now to FIGS. 1 and 2 a machine, shown in outline at 10 is provided with a feeding station A where a previously filled carrier-dispenser 12 is positioned for feeding articles to be operated on by the machine into a gravity conveyor 14. The articles are carried thereby into the operating portion B of the machine where a specific operation is carried out. From here they pass into a second gravity conveyor 16 which carries them to a filling station C on the machine. A second carrier-dispenser 12 which has been emptied is positioned above the filling station in such manner that it can be filled through the same opening from which articles were previously dispensed or it may be filled through a top opening. A vertical tube 18 serves to feed articles into the carrier 12 as they are moved upwardly by a reciprocating plunger 20 which is operated by a cam 22 and follower 24. The plunger has a concavely curved head 25. The carrier-dispenser 12 is provided with eyebolts 13 for attaching to an overhead conveyor 26 for transporting the dispenser from station to station and machine to machine.

A more detailed illustration of the carrier-dispenser is shown in FIG. 3. It must be understood that the present invention can be adapted to a wide variety of articles, but for the purpose of illustration a carrier-dispenser is described for use with races for ball bearings designated R. A generally rectangular frame 28 is of sufficient width to form the top, bottom and end walls of the carrier, and plates 32 and 34 form the opposed side walls. Spacers can be used for making adjustable widths. The frame 28 is constructed with sufficiently large radii 30 at each corner to prevent jamming of the articles R within the compartment 36. This frame could also be more nearly circular in shape although the shape shown with straight sides and curved corner sections is preferable. A feed and discharge opening 38 in the frame 28 is provided in the bottom wall adjacent one end and the wall leading to the opening is inclined at 40 to facilitate the gravity feed of the races R toward the opening 38. An adjustable block 42 is secured to the frame 28 adjacent the opening 38 to vary the opening according to the diameter of the races to be fed therethrough. This is accomplished by loosening the screws 44 and moving the block 42 and then tightening the screws to secure the block 42 in place. A gate 48 is employed to close the opening 38 to prevent the loss of articles therefrom when the carrier-dispenser is being transported from station to station. The gate 48 is carried in a channel 50 formed in the block 42. A central slot 52 is constructed in the gate 48 to allow the gate to be withdrawn from the opening 38 over a clamp screw 54. The free end of the gate is bent normal to the gate 48 to form a handle 48a.

It has been determined that a carrier of this type, although provided with inclined passageways and large radii, will not continually feed its contents without becoming jammed. To overcome this, the carrier is provided, at its feeding station A, with an eccentrically mounted disc 56 upon a shaft 58 of an electric motor 60. The arrow in FIG. 3 indicates vertical adjustability of the shaft which is sometimes desirable. The carrier-dispenser 12 is placed over the disc 56 in such manner as to receive the disc in a cut-out portion 62 of the frame 28. Upon rotation of the disc 56, it moves into the compartment 36 and contacts the races R upsetting their jammed or stagnate condition, as shown by FIG. 5. As the disc continues to rotate in the direction of the arrow it moves out of the compartment 36 and passes adjacent the discharge opening 38 thus assisting the races to be discharged from the carrier 12 into the gravity conveyor 14. The disc 56 is of a lesser thickness than the width of the compartment and the slot 62 is also of lesser width so that a portion 40a of wall 40 remains to support the races R and direct them to the opening 38. The motor which drives this disc as well as the similar disc or cam 22 should have some speed reduction unit therein. Eccentric disc 56 should turn about 4–5 r.p.m. while disc 22 should turn somewhat faster.

After the carrier 12 has discharged its contents as described above, it is transported by any means such as the conveyor 26, earlier mentioned, to the discharge end of the machine where it is positioned above the vertical tube 18 to be refilled with the articles R as they come from the machine 10. The plunger 20 receives articles R from the second gravity conveyor 16, as best shown by FIG. 10, and pushes them upwardly into the tube 18 past a detent pawl 64 which supports them in the upper part of the tube. A spring 66 urges the pawl 64 inwardly into the tube 18.

The operation sequence is as follows:

First an empty carrier-dispenser 12 is placed upon a machine 10 at the discharge end C of the machine as described above. Next a carrier-dispenser which has been previously filled with articles R to be machined is placed upon the machine 10 at the feeding end A of the machine. The gate 48, which was closed after filling to retain the articles within the carrier compartment 36 during transportation to the machine 10, is now opened by loosening the thumb screw 54 and manually sliding the gate out of the opening 38 by grasping the handle 48a of the gate 48. Then the motor 60 is energized to rotate the disc 56 which meters the articles R from the dispenser 12 into the gravity conveyor 14. The articles are carried therethrough by gravity to the operational point B in the machine where they are operated upon by the machine and then pass into the second gravity conveyor 16 to be carried, by gravity, to the plunger 20. The cam 22 which is receiving rotary motion from any convenient source such as an electric motor (not shown) imparts reciprocating motion to the plunger 20 through cam follower 24. This reciprocating motion of the plunger moves the articles R upwardly into the tube 18, past the holding pawl 64 and into the compartment 36.

After the compartment is sufficiently full the machine is stopped so that the gate 48 can be closed to retain the articles within the carrier-dispenser 12, and the carrier removed from the machine and transported to another machine. At the same time the carrier at the feeding station A, which has now become empty, is moved to the discharge end C of the machine, and another carrier which has been filled is placed at the feeding station A ready to repeat the dispensing, operating and filling cycle.

It will be noted that gravity conveyors have been employed in the illustration for convenience but should in no manner limit the invention inasmuch as it is obvious that any other means can be used such as mechanically driven conveyors. Furthermore, while two carriers are used upon the machine shown, it is also obvious that any arrangement including more than two can be used where desirable.

The structure of the carrier-dispenser 12 as illustrated by FIGS. 1 through 10 is such that it can accommodate only articles of one width, within a very small range. In the event that articles of several widths are produced, it may be advantageous to construct an adjustable width dispenser rather than constructing separate dispensers for each width. Any adjustable structure, suitable to the article being machined, can be used such as that illustrated in FIGS. 11 and 12. The carrier-dispenser generally indicated 12 has an angle iron frame 70 to which is attached the front wall 34. The corners are provided with large radii 30 similar to the carrier described earlier, a bottom opening 38 and gate 48. A similar angular lead 40 directs the articles toward the opening 38 and a cut-out (not shown) similar to 62 as described above is provided to receive the metering disc 56.

A block 72 is secured at each corner in the angle iron frame 70 and is provided with a stud 74, welded thereto. The stud extends from the block 72 to a point where it is fastened, by screws 76 to an X frame 78. The center of the X frame is provided with a tapped block 80 to receive a threaded shaft 82. A knob 84 is fastened to one end of the shaft 82 and the free end of the shaft is provided with an annular flange 83 received in an opening 86 in a block 88. The flange limits outward movement of the shaft from the block. The block 88 is attached by screws 90 to both the side wall 32 and a second X frame 92 which is fastened to the back wall for rigidity. The arms of the second X frame 92 extend substantially parallel to the arms of the X frame 78 and each terminates in a bearing block 94 which is slidably mounted upon the stud 74. It will now become apparent that rotation of the threaded shaft 82 will move the block 88, X frame 92 and back wall 32 in a direction axially of said shaft to vary the dimension Y of the compartment 100 to suit a variety of lengths of round articles. After the proper dimension Y is attained the lock 96 serves to hold the shaft 82 against further movement until such time as it is desired to change the dimension Y.

FIG. 13 shows the carrier 12 with a top wall opening 106 for feeding the work pieces to the chamber by gravity.

In FIG. 14, there is shown a dovetail bar 108 having an upper section 109 which is secured to the bottom wall of the carrier as by means of welding.

FIG. 16 shows a trackway 110 with a dovetail recess 111 to receive the bar 108. This trackway would be secured on each machine. The carrier may be secured by means of a set screw 112.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims.

What we claim is:

1. The combination of a portable dispensing hopper for generally cylindrical work pieces and means to discharge the work pieces therefrom, said hopper including a generally rectangular frame with a downwardly inclined lower wall having a discharge opening for the work pieces at the lower end thereof, and side walls carried by the frame and spaced apart a distance not less than the axial length of the work pieces to form a compartment to receive said work pieces, said lower wall also having a narrow elongated slot adjacent the discharge opening, said discharge means including an eccentrically mounted feed disc positioned for rotation within said slot to move upwardly and then downwardly into said compartment to break up any locked condition of the work pieces and urge them to move in the direction of the opening and out through the same, a motor for rotating the disc, a gate for closing the opening when the hopper is moved from place to place, and means for removably supporting the hopper in operative relation to said eccentric feed disc with the latter disposed in said lower wall slot to permit movement of the hopper to another location.

2. The combinaion of a portable dispensing hopper for generally cylindrical work pieces and means to discharge the work pieces therefrom, said hopper including a generally rectangular frame with a downwardly inclined lower wall having a discharge opening for the work pieces at the lower end thereof, and side walls carried by the frame and spaced apart a distance not less than the axial length of the work pieces to form a compartment to receive said work pieces, said lower wall also having a narrow elongated slot adjacent the discharge opening, said discharge means including an eccentrically mounted feed disc positioned for rotation within said slot to move upwardly and then downwardly into said compartment to break up any locked condition of the work pieces and urge them to move in the direction of the opening and out through the same, a block slidably mounted in the frame adjacent to the opening and movable to an adjusted fixed position to vary the size of the opening, a motor for rotating the disc, a gate for closing the opening when the hopper is moved from place to place, and means for removably supporting the hopper in operative relation to said eccentric feed disc with the latter disposed in said lower wall slot when the feed disc moves upwardly onto the hopper and out of said slot to permit movement of the hopper to another location.

3. The structure recited in claim 2 wherein one of the side walls is adjustable to permit work pieces of various lengths to be received in the hopper.

References Cited by the Examiner

UNITED STATES PATENTS

| | | | |
|---|---|---|---|
| 639,909 | 12/1899 | Shantz | 221—175 X |
| 1,099,705 | 6/1914 | Kolb | 221—175 X |
| 1,543,574 | 6/1925 | Kasser | 53—35 |
| 2,199,009 | 4/1940 | Perryman. | |
| 2,584,466 | 2/1952 | Kaserman | 221—178 X |
| 2,786,315 | 3/1957 | Schweiter | 53—242 X |
| 2,858,046 | 10/1958 | Pollman | 221—200 X |
| 2,873,063 | 2/1959 | Schweiter | 53—242 X |
| 2,889,491 | 6/1959 | MacDonald | 53—35 X |
| 2,924,356 | 2/1960 | Pollman et al. | 221—175 |
| 3,090,521 | 5/1963 | Fazekas | 221—6 |

FOREIGN PATENTS

| | | |
|---|---|---|
| 714,342 | 8/1954 | Great Britain. |
| 137,000 | 5/1960 | Russia. |

RAPHAEL M. LUPO, *Primary Examiner.*

KENNETH N. LEIMER, *Examiner.*